Nov. 28, 1972     C. BERGER     3,704,174
SOLID ELECTROLYTE DEVICE
Filed June 7, 1971
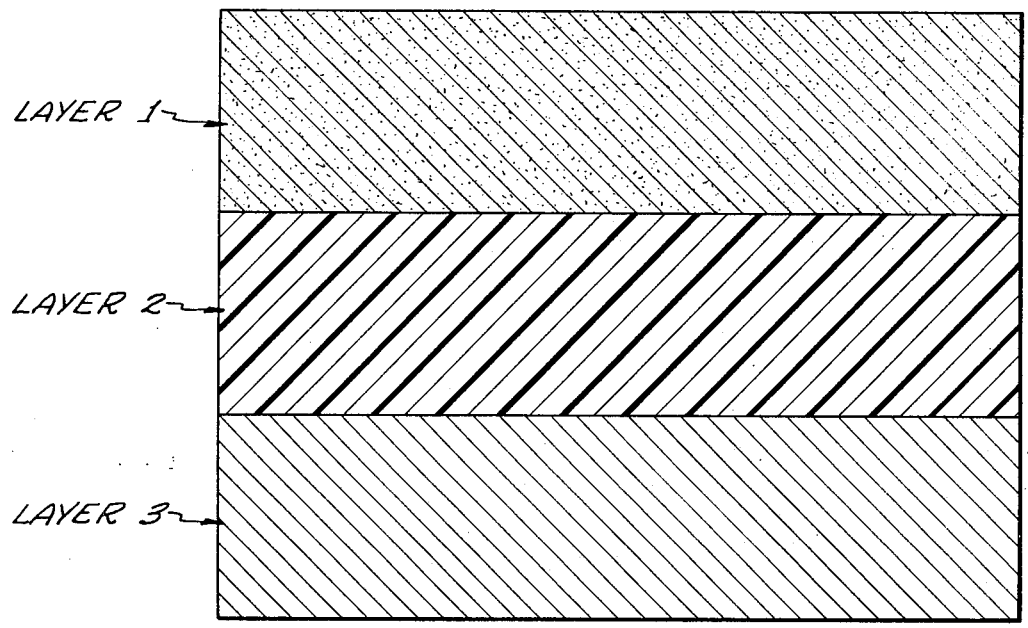
INVENTOR.
CARL BERGER United States Patent Office 3,704,174
Patented Nov. 28, 1972

3,704,174
SOLID ELECTROLYTE DEVICE
Carl Berger, 13401 Kootenay Drive,
Santa Ana, Calif. 92705
Filed June 7, 1971, Ser. No. 150,573
Int. Cl. H01m 43/06
U.S. Cl. 136—153                    10 Claims

ABSTRACT OF THE DISCLOSURE

Solid electrolytes comprising compounds having high electrolytic conductivity, wherein the compounds are complexes of salts combined with macrocyclic polyethers. Such electrolytes can be employed in electrolytic devices such as batteries or coulometric devices such as timers. Moreover they may be employed as separators in electrolytic systems, aqueous and nonaqueous; applications in electrodialysis and reverse osmosis are also feasible. The solid electrolytes of this invention represent a substantial advance in applicability and cost compared to presently available solid electrolytes.

---

The electrolyte in electrolytic devices is a vital component but at the same time is the cause of degradation of cell components and life expectancy of the cell. Aqueous solutions or separators with aqueous electrolyte solutions in them are most conventionally employed in batteries such as lead-acid, nickel-cadmium, mercury-zinc and in silver coulometers. Leakage in sealed or unsealed cells is a problem. Evaporation provides maintenance difficulties. Aqueous solutions corrode the electrodes thereby lowering capacity and shortening wet stand life. A potential solution to many of the preceding difficulties has been sought for many years. In recent years developments have occurred in producing superior electrolytes in the form of electrolytically conductive solids. The main efforts heretofore have centered about the structural modifications of AgI and have borne fruit in the synthesis of $Ag_3SI$ and $RbAg_4I_5$ as well as other highly conductive double salts such as $Ag_2S$—$Ag_2HgI_4$; B. Reuter and K. Hardel, Naturwissenschafter 48, 161 (1961), T. Takahashi and O. Yammamoto, Electrochem. Acta 11, 779 (1966), and T. N. Bradley and P. D. Greene, Trans. Faraday Soc. 62, 2069 (1966). In these solid electrolytes the major form of electrolytic transport is by the silver ion which is considered as migrating through the atomic lattice. The silver is derived from a silver anode which converts Ag to $Ag^+$, which migrates through the lattice and reacts at the cathode with reduced iodine or iodine complex contained in such cathode, or with other cathodes such as bromine-carbon, selenium, and tellurium.

These materials have high electrolytic conductance in the range of about .001 ohm$^{-1}$ cm.$^{-1}$ to about 0.25 ohm$^{-1}$ cm.$^{-1}$. These materials are usually produced in powdered form and compacted under pressure to form hard rigid wafers.

The solid electrolyte materials have many advantages as compared to conventional systems. Among these are elimination of water from the electrolyte system, long term operational stability, long shelf life, no gassing and complete hermetic sealing.

However, there are disadvantages which accrue as a result of the inorganic nature of the above described solid electrolytes. The wafers or compacts thereof are hard and rigid and therefore susceptible to shock more so than flexible system. Because of this rigidity, serious limitations as to the size of such a solid electrolyte exist. Moreover, solid rigid bodies are limited with respect to thinness, far more than a flexible film would be. Therefore such solid electrolytic devices must be heavier and larger than optimization often require. Finally, solid rigid materials are seriously restricted with respect to configurational freedom.

According to the present invention there is provided radically new solid electrolytes which are organic material with high electrolytic conductivity at ambient temperatures, higher by 2–3 orders of magnitude than the most conductive inorganic electrolytes. Therefore in conventional wafer type configurations higher currents may be drawn at comparable internal resistances and voltages. In addition, because of its organic nature, the electrolyte may be deposited in thin strong films which are also not rigid and fragile. Moreover the anode is not limited to silver and since more active metal anodes may be employed than with the inorganic electrolytes considerably higher power may be derived. Such anodes as K, Na, Ba, Cd, Li and others may be employed.

The macrocyclic polyethers of this invention are ring structures wherein the oxygen atoms in the ring structure are separated preferably by adjacent two carbon atoms. The two carbon atoms may be $CH_2$ groups or parts of benzene or cyclohexyl rings. Although other configurations are possible it has been found (C. J. Pederson Fed. Proc. 1968 27 1305) that rings containing four, five or six or less preferably eight oxygen atoms complexed effectively with lithium, sodium or potassium.

The salt-polyether complexes are produced by ion dipole interaction between a cation and the negatively charged oxygen atoms arranged symmetrically in the ring. Stable complexes are not formed if the cation member of the salt is too large to lie in the hole of the cyclic polyether. For example the Dibenzo-18-crown-6-polyether has a diameter of 4 angstroms. Ammonium ions form a complex but the tetramethylammonium ion with a diameter of 7 angstroms does not. It also appears that as ring size increases complexing efficiency decreases for smaller cations but larger cations such as cesium still form effective complexes. It is important to note that the stoichiometry of the metal ion to the complex remains 1:1 despite differences in charge, pointing up again the electrostatic nature of the attraction and more importantly the importance of the "fit" of the ion into the hole of the polyether. Another factor of some importance is that ions which solvate strongly such as $Li^+$, $Mg^{++}$ and $Ca^{++}$ conversely do not form stable complexes. The solvent sheath not only diffuses the cation charge but increases the effective diameter making the "fit" into the ether ring difficult or impossible. Useful polyether complexes may be represented by the formula $R_b O_n S_c/X$ where R is an organic ring structure, O is oxygen in the ether ring, S represents adjacent carbon atoms separated by the oxygen atoms of the ether ring, X is a salt forming a stable polyether complex and $b$ varies from 1 to 4, $n$ varies from 4 to 8 and $c$ varies from 2 to 4. The solid complexes are prepared by:

Method 1.—One mole of polyether is warmed with thorough mixing with 1 mole of salt. No solvent is used.

Method 2.—One mole of polyether and 1 mole of salt are dissolved in a suitable solvent and the solvent removed by evaporation, usually under vacuum.

Method 3.—One mole of polyether and 1 mole (or an excess) of salt are dissolved in a minimum quantity of hot solvent, and the complex is precipitated by cooling and recovered by filtration.

Method 4.—One mole of polyether is heated with 1 mole of (or an excess) of salt in a solvent in which the salt is readily soluble, and the polyether is converted into the crystalline salt complex without the system ever becoming a clear solution. The complex is recovered by filtration.

Method 5.—One mole of polyether in a water-immiscible solvent is mixed with 1 mole (or an excess) of salt in water. The resulting complex being less soluble in either solvent than the original compounds, separates as crystals.

It is an object of this invention to provide solid organic electrolyte elements comprising an ionically conductive macrocyclic polyether complex. It is a further object of this element to employ the aforesaid electrolyte in electrochemical devices such as battery cells and electrochemical timers.

As described above the preferred and most versatile complexing agents described herein are polyethers containing six oxygen atoms. Two, three or four adjacent carbon atoms may separate the oxygen ether atoms but preferably each oxygen atom is separated from the other by two adjacent carbon atoms which may be methylene carbons or carbons in ring structures. In addition the two compounds of most interest are dibenzo-18-crown-6 (I) and dicyclohexyl-18-crown-6 (II), which contain two ring structures. It is obvious that many variations are possible such as dibenzo-14-crown-4 in which there are only 4 oxygen atoms in the ether ring or tetrabenzo-24-crown-8 where there are eight oxygen atoms in the ether ring and which contains four ring structures. The key element in complex stability is the relationship between the size of the ion being complexed and the diameter of the ether structure. For example the diameter of the holes in dibenzo-18-crown-6 (I) and dicyclohexyl-18-crown-6 (II) is about 4 angstroms. Since the ionic diameter of $K^+$ is 2.66, the complex formed between (II) and KCNS is very stable.

This stability has a remarkable and unexpected effect. The electrolytic specific conductivity of (II) —KCNS complex is about $0.7-1.3\Omega^{-1}$ cm.$^{-1}$ in the temperature range ambient to about 70° C. This is greater by a factor of 3–30 than the presently known solid electrolytes such as $RbAg_4I_5$ and $Ag_3SI$. It is thought that the negative cloud of electrons from the oxygen ring tightly holds by electrostatic attraction the positive ion ($K^+$ in this case) causing lessened attraction between the $R^+$ and $CNS^-$. This would cause $CNS^-$ to migrate under a direct potential if not sterically hindered. However, depending on complex stability (substantially, the fit of the cation into the ether ring) it is conceivable that mixed migration or cationic migration could occur. For example in the case of the complex between dimethyl dibenzo-18-crown-6 and barium difluorenyl, the anion is so bulky that spectral observations make it likely that the $Ba^{++}$ ion moves rapidly up and down through the hole of the polyether ring. Depending on the stability of the complex, specific conductivies for materials of interest cover the range from about $.001-1.0\Omega^{-1}$ cm.$^{-1}$ at ambient temperatures with maximum interest focused on the higher end of the range.

As indicated previously one of the important advantages of this invention is that it can be employed with higher E.M.F. metals such as the alkali metals as anodes. Other metals corresponding to complexed cations may be employed such as Ba, Cd, Pb and Hg. The respective cations of other metals such as $Ag^+$, $Au^+$ and $Ce^{+++}$ as well as $NH_4^+$ also produce complexes.

Some anions corresponding to cathodic elements that may be employed in galvanic systems are $I^-$, $CNS^-$, $Br^-$, $OH^-$, $Cl^-$, $C_2H_3O_2^-$, $NO_2^-$ and $I_3^-$.

Some salts therefore that may be employed to form the complexes are KCNS, $NaBr$, KI, $NaNO_2$, $Ba(OH)_2$, $CdCl_2$, $Pb(C_2H_3O_2)$, $NH_4CNS$, $PdCl_2$.

It is clear therefore that a variety of battery cells may be devised depending on the requirements and cost factors for each application. Examples of such cells are K/(II)-KCNS/(CNS)$_2$, Na/(I) NaCl/Cl$_2$ and Ba/IBa(OH)$_2$. Cells such as this can be used as portable power sources and in microcircuitry. In addition the solid electrolytes of this invention can usefully be employed as coulometers in timers and warranty devices.

Various materials may be employed to dilute the solid electrolyte of this invention without impairing greatly its conductivity. For example dilution of the electrolyte to 95–99 percent solid electrolyte may be effected by a corresponding amount of inorganic material such as glass or silica or by organic diluents such as plastics or plasticizers which do not degrade the conductivity by more than 50–90 percent. Examples of plastics employed are silicones, polysulfone and polymethyl methacrylate. Such composite materials make handling easier and ionically conductive sheets can be produced as well as films for separator use in conventional aqueous and nonaqueous batteries.

It is important to note that anodes and cathodes may also be mixed with other materials to promote better electrode-electrolyte contact e.g. K may be used as a 75:25 mixture with the solid electrolyte employed. In a similar fashion carbon may be mixed with cathodes to promote conductivity. Teflon may also be added to electrodes to promote cohesiveness. Other materials may also be employed to promote cohesiveness or conductivity. For the latter effect graphite, platinum and gold may be employed. For cohesiveness silicone resins, polymethyl methacrylate and polysulfones can be used.

The examples following are illustrative of the practice of the invention with respect to a preferred embodiment relative to conductive solid electrolytes and solid state electrochemical cells in which they are incorporated. These examples should not be construed as limiting with respect to other solid state electrochemical devices or with respect to optimization of current and voltage of the cell which are related to the nature of the electrode materials, the solid electrolyte employed, cell configuration and the internal resistance of the cell. Cell optimization may be achieved by conventional electrochemical experimentation as shown below in examples and known art relating to solid state cells. The figure shows a cross sectional view of the idealized embodiment of the electrochemical cell of this invention. The layer 1 is an anode such as K, Na or Cd, layer 2 is the solid organic conductive electrolyte, the major element of the invention, and layer 3 is the cathode such as $I_2$—C, $Br_2$—C and platinum/$O_2$. This is a conventional configuration for a solid electrolyte galvanic system as described in Examples 1, 2, 3, 5, 6 and 7. In the latter example the configuration is similar but the layers are thinner since they were laid down by vacuum techniques and silk screening. In Example 4 the configuration is also the same except that layers 1 and 3 are identical since the device is a coulometer which is powered externally.

EXAMPLE 1

Dicyclohexyl-18-crown-6 (II) (.1 mole, 37 grams) and KCNS (.1 mole, 9.7 grams) are dissolved in methanol. The solution is then vacuum evaporated to dryness. The crystals obtained from this process are powdered and subjected to analysis. The complex (II) —KCNS has a formula of $C_{21}H_{36}NO_6SK$ with a molecular weight of 469 and a M.P. of 72–122° C. The broad melting point is caused by the fact that (II) is a mixture of isomers produced when (I) is hydrogenated to produce (II).

The complex powder is put into a die and compressed to a pellet 5 cm.$^2$ in area and .025 cm. in thickness. A anode wafer of potassium 5 cm.$^2$ and .05 cm. in thickness is pressed into a platinum gauze. A pelletized cathode mixture of $(CNS)_2$ and activated carbon, also 5 cm.$^2$ and 0.5 cm. in thickness is also pressed into a platinum gauze. The electrodes are placed on either side of the solid electrolyte wafer and all three compressed in a die. The entire assembly is then covered with potting compound and allowed to set. An open circuit voltage of 3.3 is recorded. A current of 100 ma./cm.$^2$ is noted on closed circuit.

EXAMPLE 2

The same procedure is employed as described in Example 1 except that (II) —KI is used as the conductive solid electrolyte and a mixture of iodine and carbon is used as a cathode. The formula for (II) —KI is $C_{20}H_{36}O_6IK$ and it has a M.P. of 123–170° C. An open circuit voltage of 2.2 is recorded and a current of 5 ma./cm.$^2$ is noted on closed circuit.

EXAMPLE 3

The procedure was followed as in Example 2 but (I) —KI was used as the conductive solid electrolyte. The formula for the solid electrolyte is $C_{20}H_{24}O_6IK$ with a M.P. of 232–234° C. The open circuit potential for this system was 2.2 and a current of 1 ma was recorded.

EXAMPLE 4

The procedure was followed as in Example 2 but a $I_2$— carbon pellet was substituted for the anode wafer. A voltage was imposed on the system until the Iodine was depleted at the negative (reducing) electrode. The current of 50 microamperes diminished and the voltage rose rapidly to 10. This device serves as the working mechanism of a timer, coulometer or warranty device.

EXAMPLE 5

Butylbenzo-15-crown-5. NaBr complex was synthesized in a manner similar to that of Example 1 and a cell with a sodium anode and a bromine-carbon cathode construction also as in Example 1. The formula for the complex is $C_{18}H_{28}O_5$ BrNa with a M.P. of 77–84° C. A current drain of 0.5 ma. was noted.

EXAMPLE 6

(I)— $Ba(OH)_2$ was employed as the solid conductive electrolyte with a barium anode and a platinum-Teflon $O_2$ cathode careful closed circuit measurements indicated that the cell was operating as on air electrode with 0.1 to 10 ma. of current passing.

EXAMPLE 7

0.1 mole of (I) is poured into a solution of 0.1 mole of $CdCl_2$ in butanol and the mixture heated. The polyether is converted into the crystalline salt complex (I)—$CdCl_2$ whose analytical formula corresponds to $C_{20}H_{24}O_6Cl_2Cd$ and whose M.P. is >300° C. Onto a glass plate is vacuum deposited a gold film 1 cm. x 2 cm. On top of this film is vacuum deposited a 5000 A. thick layer of cadmium 1 cm. x 1 cm. which serves as an anode. On top of the cadmium is deposited I—$CdCl_2$ which has been powdered and vacuum sputtered at $5 \times 10^{-5}$ mm. The dimensions of the solid electrolyte are also 1 cm. x 1 cm. A mixture of $Cl_2$ adsorbed into highly porous graphite and powdered I—$CdCl_2$ is silk screened onto the solid electrolyte. Finally another film of gold is vacuum deposited orthogonally to the underlying gold film. The entire device is dipped in epoxy after contact leads are attached to the gold tabs. On closed circuit measurement a current of $25\mu$ amperes is observed.

While I have described particular embodiments of my invention for purposes of illustration, it will be understood that various modifications and adaptations thereof may be made within the spirit of the invention and the invention is not to be taken as limited except by the scope of the appended claims.

I claim:

1. An electrochemical device which includes a solid organic electrolyte element comprising an ionically conductive macrocyclic polyether complex having the formula $R_bO_nS_c/X$ wherein R is an organic ring structure, O is oxygen in the ether ring, S represents adjacent carbon atoms separated by the oxygen atoms of the ether ring, X is a salt forming a stable polyether complex and $b$ varies from 1 to 4, $n$ varies from 4 to 8 and $c$ varies from 2 to 4 and means for providing a flow of ions through said electrolyte element.

2. An electrochemical device according to claim 1 where $b$ is 2, $n$ is 5 to 7 and $c$ is 2.

3. An electrochemical device according to claim 1 where $b$ is 2, $n$ is 6 and $c$ is 2.

4. An electrochemical device according to claim 3 where R is a member of the benzene family.

5. An electrochemical device according to claim 3 where R is a member of the cyclohexyl family.

6. An electrochemical device according to claim 5 wherein the complex is dicyclohexyl-18-crown 6/KCNS.

7. An electrochemical device according to claim 4 wherein the complex is dibenzo-18-crown 6/KCNS.

8. An electrochemical device according to claim 1 consisting of a solid state electrochemical cell comprising two electrodes and said solid organic electrolyte element disposed between them.

9. An electrochemical device according to claim 8 where the two electrodes are a potassium anode and iodine cathode with the solid organic electrolyte dicyclohexyl-18-crown 5/KI disposed between them.

10. An electrochemical device according to claim 8 where the two electrodes are on iodine-carbon mixture with the solid organic electrolyte dicyclohexyl-18-crown 6/KI disposed between them.

References Cited

Pedersen, Ionic Complexes of macrocyclic polyethers, Federal Proceedings, vol. 27, No. 6, 1968, pp. 1305–1309.

Foley, Solid Electrolyte Galvanic Cells, J. Electrochemical Society, January 1969, pp. 13C–22C.

DONALD L. WALTON, Primary Examiner

U.S. Cl. X.R.

252—62.2